United States Patent
Hugon et al.

(10) Patent No.: US 10,598,096 B2
(45) Date of Patent: Mar. 24, 2020

(54) ROTOR DISK HAVING A CENTRIPETAL AIR COLLECTION DEVICE, COMPRESSOR COMPRISING SAID DISC AND TURBOMACHINE WITH SUCH A COMPRESSOR

(71) Applicant: Snecma, Paris (FR)

(72) Inventors: Nadège Hugon, Montgeron (FR); Nicolas Trappier, Maisons Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 563 days.

(21) Appl. No.: 15/111,314

(22) PCT Filed: Jan. 20, 2015

(86) PCT No.: PCT/FR2015/050135
§ 371 (c)(1),
(2) Date: Jul. 13, 2016

(87) PCT Pub. No.: WO2015/110751
PCT Pub. Date: Jul. 30, 2015

(65) Prior Publication Data
US 2016/0333796 A1 Nov. 17, 2016

(30) Foreign Application Priority Data

Jan. 24, 2014 (FR) ...................................... 14 50616

(51) Int. Cl.
*F02C 9/18* (2006.01)
*F04D 29/32* (2006.01)
(Continued)

(52) U.S. Cl.
CPC ................. *F02C 9/18* (2013.01); *F01D 5/08* (2013.01); *F01D 5/082* (2013.01); *F01D 5/084* (2013.01);
(Continued)

(58) Field of Classification Search
CPC . F01D 5/08; F01D 5/082; F01D 5/084; F01D 5/085; F01D 5/087; F01D 25/08;
(Continued)

(56) References Cited

U.S. PATENT DOCUMENTS 5,628,621 A * 5/1997 Toborg .................... F01D 5/066
416/198 A
6,648,592 B2 * 11/2003 Escure .................... F01D 5/082
415/115
(Continued)

FOREIGN PATENT DOCUMENTS

EP 2123860 11/2009
FR 2825413 12/2002
(Continued)

OTHER PUBLICATIONS

International Search Report and Written Opinion with English Language Translation, dated May 4, 2015, Application No. PCT/FR2015/050135.

*Primary Examiner* — Brian P Wolcott
(74) *Attorney, Agent, or Firm* — Womble Bond Dickinson (US) LLP

(57) ABSTRACT

The rotor disk (3B) for a compressor comprises, relative to the rotational axis of the disk: a radial web (4), blades (8) at the outer periphery of the web, a bore (5) at the inner periphery of the web, and a cylindrical side wall (12) extending the web in the vicinity of the ter periphery of same and having an air supply port (18), and—a centripetal air collection device (15). Advantageously, the device (15) comprises a cylindrical support (23) and at least one air supply tube (16), the inlet of which is turned towards the port (18) and the outlet of which is turned towards the bore (5) in the web, the disk comprising an inner radial flange (40) extending from the cylindrical side wall (12), the cylindrical support (23) of the device (15) being attached to said inner
(Continued)

radial flange (40), and a ring (30) extending from the web (4), the cylindrical support (23) being centred on the ring (30).

9 Claims, 3 Drawing Sheets

(51) Int. Cl.

| | | |
|---|---|---|
| *F01D 5/08* | (2006.01) | |
| *F02C 3/04* | (2006.01) | |
| *F04D 19/02* | (2006.01) | |
| *F04D 27/00* | (2006.01) | |
| *F04D 29/54* | (2006.01) | |
| *F01D 25/12* | (2006.01) | |
| *F01D 25/08* | (2006.01) | |
| *F04D 29/64* | (2006.01) | |

(52) U.S. Cl.
CPC ............ *F01D 5/085* (2013.01); *F01D 5/087* (2013.01); *F02C 3/04* (2013.01); *F04D 19/02* (2013.01); *F04D 27/009* (2013.01); *F04D 29/321* (2013.01); *F04D 29/545* (2013.01); *F04D 29/644* (2013.01); *F01D 25/08* (2013.01); *F01D 25/12* (2013.01); *F05D 2220/323* (2013.01); *F05D 2240/35* (2013.01); *Y02T 50/671* (2013.01); *Y02T 50/676* (2013.01)

(58) Field of Classification Search
CPC ...... F01D 25/12; F04D 29/545; F04D 29/321; F04D 27/009; F04D 19/02; F02C 9/18; F02C 3/04
See application file for complete search history.

(56) References Cited

U.S. PATENT DOCUMENTS

| | | | | |
|---|---|---|---|---|
| 7,086,830 | B2 * | 8/2006 | Fitzgerald | F01D 5/082 415/115 |
| 7,159,402 | B2 * | 1/2007 | Hein | F01D 5/081 415/115 |
| 7,344,354 | B2 * | 3/2008 | Lammas | F01D 5/081 29/889.2 |
| 7,552,590 | B2 * | 6/2009 | Drevs | F01D 5/08 415/115 |
| 7,828,514 | B2 * | 11/2010 | Kutz | F01D 5/081 415/1 |
| 8,250,870 | B2 * | 8/2012 | Hein | F01D 5/081 415/115 |
| 10,030,517 | B2 * | 7/2018 | Corcoran | F01D 5/022 |
| 2007/0053770 | A1 | 3/2007 | Lammas et al. | |

FOREIGN PATENT DOCUMENTS

| | | |
|---|---|---|
| FR | 2930589 | 10/2009 |
| FR | 2952138 | 5/2011 |

* cited by examiner

US 10,598,096 B2

ROTOR DISK HAVING A CENTRIPETAL AIR COLLECTION DEVICE, COMPRESSOR COMPRISING SAID DISC AND TURBOMACHINE WITH SUCH A COMPRESSOR

BRIEF SUMMARY OF THE INVENTION

The present invention relates to a rotor disc having a centripetal air bleed device and more particularly, albeit not exclusively, to the arrangement of the centripetal air bleed device in discs for axial compressors of small turbine engines (turboprop engines and turbojet engines).

Generally, axial compressors in which the inlet air stream flows in the turbine engine comprise a plurality of coaxial and alternate stages of rotor discs and vaned stator discs, the air stream to be compressed, which flows from upstream to downstream of the engine, passing through said discs so as to move towards the combustion chamber of said engine.

A schematic view of an axial compressor 2 of a turbine engine 1 having an axis A is shown in FIG. 1 together with an enlargement L thereof, from which the stator vanes have been deleted. A view of this type corresponds to that in document FR-2825413 by the applicant. The rotor discs 3 each comprise an annular radial web 4 (or connecting piece) comprising, in the inner periphery thereof, a central bore 5 through which, inter alia, the turbine shaft 6 of the turbine engine and the corresponding blade 8 connected to a rim 7 passes, the rim 7 forming the end of the outer periphery of the web 4. In order to coaxially interlink the rotor discs 3, the rotor discs are rigidly interconnected by connection means 10 of the type having bolts 10A which, in this embodiment, fasten flanges 11, which form the end of the cylindrical lateral walls 12 of the discs, to the webs 4 of the adjacent discs. All the walls 12 joined in this way form a continuous inner wall which defines the flow in the air duct 13.

Therefore, the centripetal air bleed device 15 which is used to ensure ventilation or cooling of certain parts of the turbine engine 1, for example the ventilation of the high-pressure turbine, the ventilation of the bores in the high-pressure compressor discs, the pressurisation of the lubrication chambers, the ventilation of the low-pressure turbine etc., is provided in the annular cavity 14 defined by two consecutive rotor discs of the compressor 2, which are upstream 3A and downstream 3B (see enlargement L), respectively, in the direction of the air flow F in the duct 13. This ventilation is advantageously achieved by the inner air flow F of the engine which is flowing in the duct 13.

For this purpose, as shown in particular in the enlargement L of FIG. 1, the device 15 comprises tubes 16, the inlets 17 of which communicate with the air duct 13 by means of at least one opening 18 provided in the cylindrical lateral wall 12 of the downstream disc 3B, and the outlets 19 of which, which are located in the region of the central bores in the discs, communicate with the shaft 6 of the turbine to be ventilated. The tubes 16 are arranged substantially radially and are supported by a cylindrical support 23 of the device which is rigidly connected to the discs. As a result, some of the cool air flow F flowing in the duct 13 centripetally enters the inner passages 20 of the radial tubes 16 via the openings 18 so as to be distributed in the direction of the shaft 6 and axially along said shaft as far as the turbine, in order to cool said turbine, as shown by the arrows F1 in FIG. 1.

In the type of engine shown in FIG. 1 (such as a bypass turbojet engine), owing to the large size thereof, the air bleed device 15 can be both arranged in the selected interdisc cavity and connected to the compressor discs in a relatively simple manner, bolts 10A therefore being used as means 10 for connecting two consecutive bladed discs.

Conversely, in engines having smaller dimensions, smaller compressors and parts which are difficult to access, it is more difficult to install the air bleed device in the interdisc cavity which is thus smaller, despite the fact that toothed connection means or curvic couplings (which are described for example in document FR-2952138) are used as the means 10 for connecting consecutive discs. This is in particular the case for the compressor 2 of a turboprop engine 1 which is shown in part in FIG. 2, in which identical reference numerals denote similar elements to those in FIG. 1.

These toothed connection means 10 make it possible to reduce the axial size compared with connection means 10 using bolts 10A and flanges. This is because the cylindrical walls 12 of the discs are directly contacted by sets of conical teeth 10B and 10C, as is shown in FIG. 2, without this making the discs more fragile. Indeed, these discs are made more fragile when bored for the purpose of fastening the flanges thereto, and this means that thicker discs are required, which has an effect on other parameters too.

The sets of conical teeth ensure that all the discs 3 of the compressor are rotated and are coaxial with one another. A set of teeth 10B which is generally conical forms the end of the transverse free end of the cylindrical lateral wall 12 of a disc and engages with a complementary set of teeth 10C which forms the end of the transverse free end of the lateral wall facing the disc which is to be connected.

It is also noted that the air-supply opening 18 in the duct, which is made in the cylindrical wall 12 of the downstream rotor disc 3B, and the stator 21 come into contact with a knife-edge sealing device made of an abradable material 22 which is provided so as to be complementary to the cylindrical wall 12 of the rotor disc.

In the view in FIG. 2, the air bleed device 15 comprises a cylindrical support 23 which is mounted in advance on an annular flange 24, which projects perpendicularly from the radial web 4 of the upstream disc 3A, so as to be located close to the central bore 5. The support 23 is fastened to the flange 24 by means of bolts 25. The radial air-supply tubes 16 are then mounted through opposing holes 26, 27 provided in the support 23 and the flange 24 in order to lead radially into the annular cavity 14 in the discs 3A, 3B between the webs 4, and in order to come close, at the inlets 17 thereof, to the lateral wall 12 of the discs and, at the outlets 19 thereof, to the central bores facing the turbine shaft to be ventilated.

A locking means 28 ensures that the air bleed tubes 16 are held in the support 23 and the flange 24. Furthermore, a ring or an annular flange 30 which projects perpendicularly from the radial web 4 and in which the support 23 is inserted so as to center said web is provided in the downstream disc. Therefore, the bleed device is fastened to one of the discs and centered on the other disc.

While it is technically possible to produce the air bleed device to have a compressor of this type comprising rotor discs having toothed connections, there are however disadvantages to this.

First of all, since the device is fastened to one of the discs and then centered on the other disc, it is awkward, cumbersome and time-consuming to install said device.

In addition, since the webs of the rotor discs of the compressor have a limited thickness for this type of compact engine, the centripetal air bleed device tends to cause stresses in the upstream rotor disc to which it is fastened, to the extent that there may be excess stresses in the disc, and this is undesirable.

Furthermore, this means that the centering in the region of the device and the downstream rotor disc is at risk of becoming impaired, i.e. the centering therebetween is at risk of "breaking open", and this causes leaks in this region. Given the fact that there may be leaks, it is necessary to over-dimension the air bleed system, and this therefore reduces the performance of the engine because the bled air is withdrawn from the main duct.

Furthermore, if production is carried out in this manner (FIG. 2), it is impossible to directly machine the diametrically opposed teeth of the toothed connection of the upstream disc when the projecting annular flange 24 of the web is used to fasten the support of the tubes. Indeed, this flange extends far beyond the teeth 10B of the connection means 10 in a radial projection from the axis A. This means that it is necessary to machine the teeth tooth by tooth, and this increases the time needed for machining and results in additional costs.

The present invention aims to overcome the above disadvantages and relates to a rotor disc for a compressor, the design of which makes it possible to install the centripetal air bleed device in a simple manner, increase the mechanical strength of the disc, reduce the risk of leaks, and diametrically machine the teeth of the curvic connections of the two discs enclosing the bleed device.

For this purpose, the rotor disc, in particular for a compressor, comprises, relative to the axis of rotation of the disc:
 a radial web, blades on the outer periphery of the web, a bore in the inner periphery of the web, and a cylindrical lateral wall which extends the web in the region of the outer periphery thereof and has an air-supply opening, and
 a radial, centripetal air bleed device, comprising a cylindrical support and at least one air-supply tube, the inlet of which faces the air-supply opening, and the outlet of which faces the bore in the web, an inner radial flange extending from the cylindrical lateral wall, the cylindrical support of the device being fastened to said inner radial flange, and a ring extending from the web, the cylindrical support being centered on the ring.

According to the invention, the rotor disc is characterised in that locking means are provided between the cylindrical support of the air bleed device and the centering ring of the radial connecting piece.

The support of the bleed device, which is adjusted and locked in this manner, therefore advantageously remains in contact with the ring of the disc, and this reduces the risk of leaks which in turn prevents the air bleed system from being over-dimensioned and maintains the performance of the engine.

By virtue of the invention, rather than clamping the air bleed device on one of the two consecutive rotor discs and centering it on the other rotor disc, the device is fastened to and rests on just one of the rotor discs, and this can make it easier to mount (and dismount) said device, makes it possible to work on parts which are difficult to access, and makes the disc-device unit more rigid by maximising the distribution of the forces passing therethrough. Indeed, the centrifugal force generated by the device is absorbed as a result of said device being fastened to and centered on the same disc. Moreover, the air bleed device is connected in its entirety in the inner space defined by the web and the lateral wall of the disc, so much so that the axial size is inevitably reduced, which is advantageous for small engines.

It is also noted that the device is structurally mounted on the disc in a simple and reliable manner by being fastened to the radial flange (by locking means) and centered in the ring of the disc, whilst also being housed in the internal space of the disc.

According to another feature, the cylindrical lateral wall is provided, at its free end, with toothed connection means, said fastening flange being located behind (axially offset) the toothed connection means. As a result, the internal space of the disc vertically in line with the connection means is free such that it is possible to machine the teeth of this disc diametrically.

Furthermore, the locking means are defined by at least one axial side slot which is made in the centering ring of the disc and ends in an angular slot, and by a radial lug which projects from the cylindrical support and is successively inserted in the slots, thus locking the support in the ring of the connecting piece.

Furthermore, the inner radial fastening flange is connected to the lateral wall of the disc by welding. This is particularly advantageous for engines of a reduced size, the machining of which could otherwise prove difficult.

A vibratory damping means is preferably provided between the air-supply tube and the support of the air bleed device.

In particular, the damping means comprises a split tube having elastically deformable petals which are inserted in the air-supply tube so as to rest against said air-supply tube and absorb the vibrations, the "air-supply tube and damper tube" unit being held in the support of the air bleed device.

Furthermore, in order to ensure efficient and uniform cooling, said air bleed device comprises a plurality of air-supply tubes which are arranged substantially radially in receiving holes in the cylindrical support and angularly distributed around said support in a uniform manner.

The invention also relates to a compressor comprising:
 coaxial rotor discs each having a radial web, blades which are arranged on the outer periphery of the web and through which an air stream passes, and a bore in the inner periphery of the web, said discs being rotatably interlinked by toothed connection means which form the end of the cylindrical lateral walls of the disc, and
 a centripetal air bleed device which is arranged between the webs of two consecutive discs and guides air from the duct towards the bores.

Advantageously, the compressor is characterised in that said centripetal air bleed device is connected in its entirety in the internal space between the web and the lateral wall of one of said consecutive discs in the manner defined above, the toothed connection means of the disc projecting from the connected device, and in that the internal space of the other of said consecutive discs, which is defined by the wall lateral to toothed connection means, is free, i.e. unobstructed, at least vertically in line with the toothed connection means thereof.

Therefore, owing to the device being fastened and centered on the same disc, the fastening flange as illustrated in FIG. 2 is removed and the diametric machining of the teeth of the toothed (curvic) connection of the rotor disc in question can be carried out immediately, and so too can the machining of the toothed connection of the disc comprising the connected air bleed device, since said device is not vertically in line with the toothed connection means.

The centripetal air bleed device is preferably rigidly connected, in relation to the flow direction in the air duct, to the downstream disc of the two consecutive discs, which are upstream and downstream respectively.

The invention also relates to an aircraft turbine engine comprising at least one axial compressor having an air bleed device, a combustion chamber and a turbine. The axial compressor is advantageously as described above.

BRIEF DESCRIPTIONS OF THE SEVERAL VIEWS OF DRAWINGS

The figures of the accompanying drawings will give a clear understanding of how the invention can be implemented. In these figures, identical references denote like elements.

DETAILED DESCRIPTION OF THE INVENTION

Figure 1:
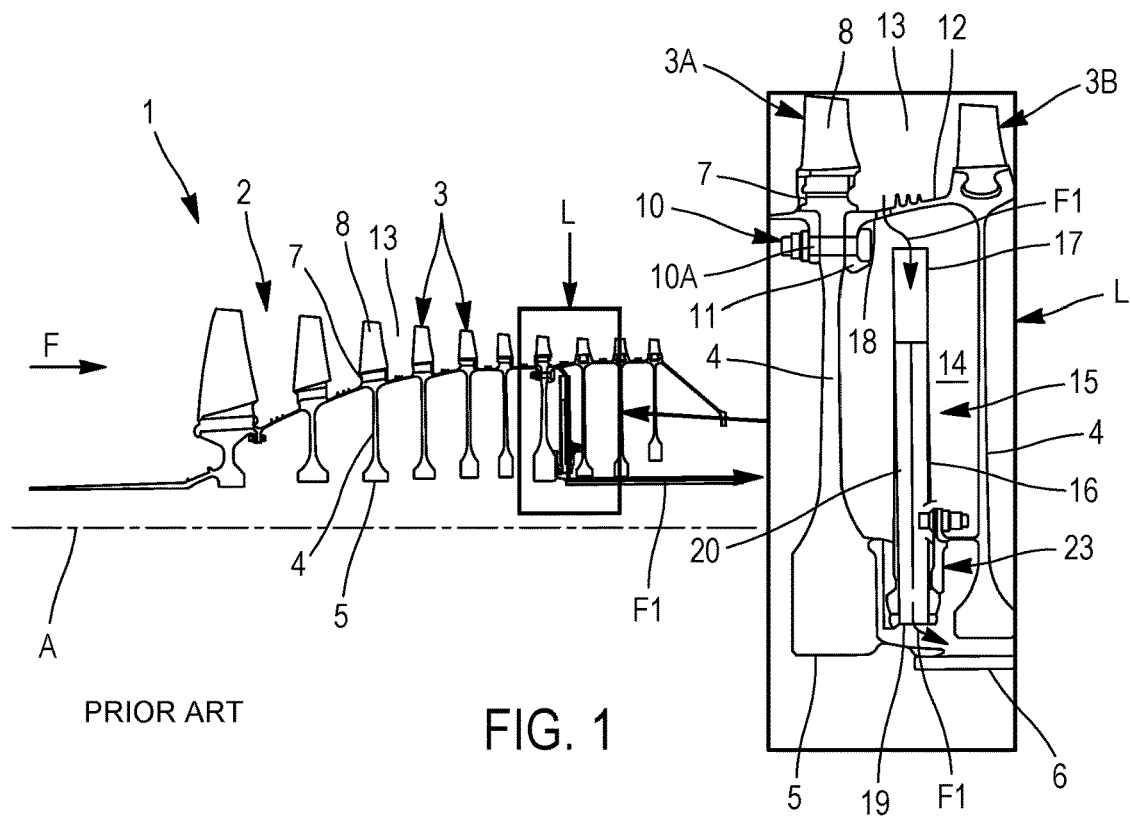
FIG. 1 is a longitudinal and schematic half-sectional view of a high-pressure axial compressor for a turbine engine, comprising rotor discs, which are interlinked by bolt connection means, and a radial, centripetal air bleed device, according to the prior art described above.
Figure 2:
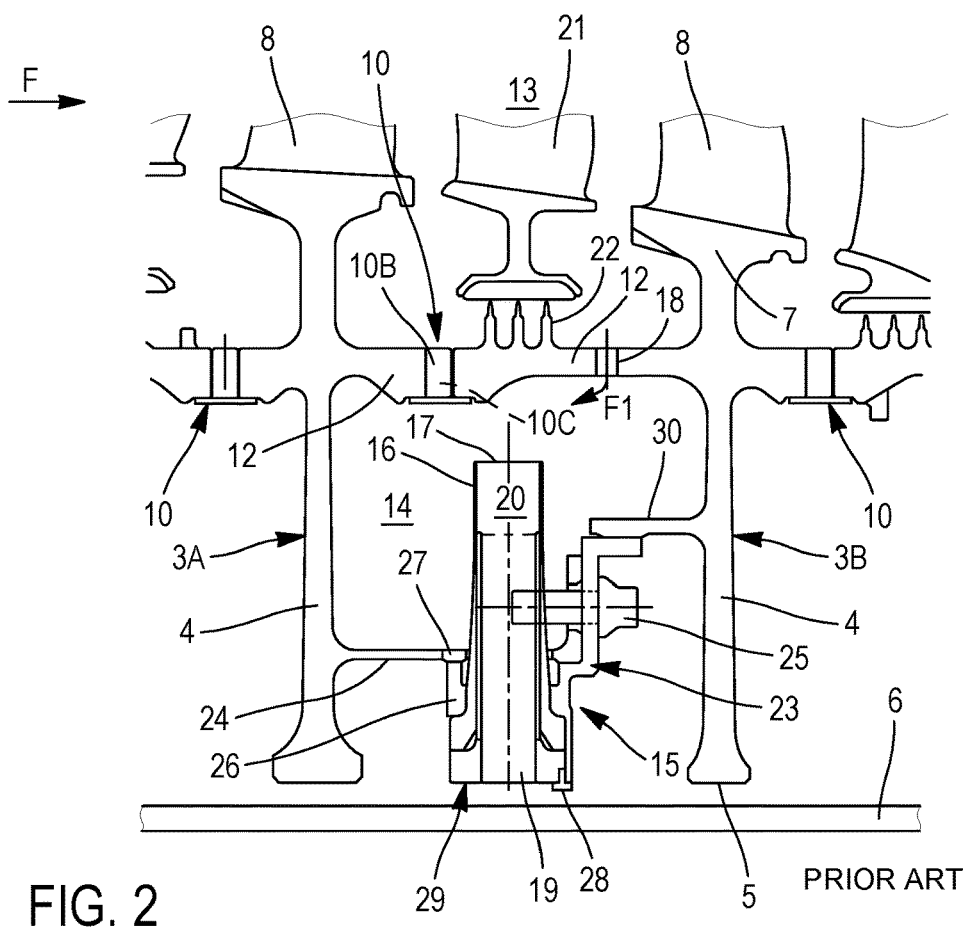
FIG. 2 is a longitudinal and schematic half-sectional view of a portion of a compressor for a turbine engine, comprising rotor discs, which are interlinked by toothed connection means, and a radial, centripetal air bleed device, according to the prior art described above.
Figure 3:
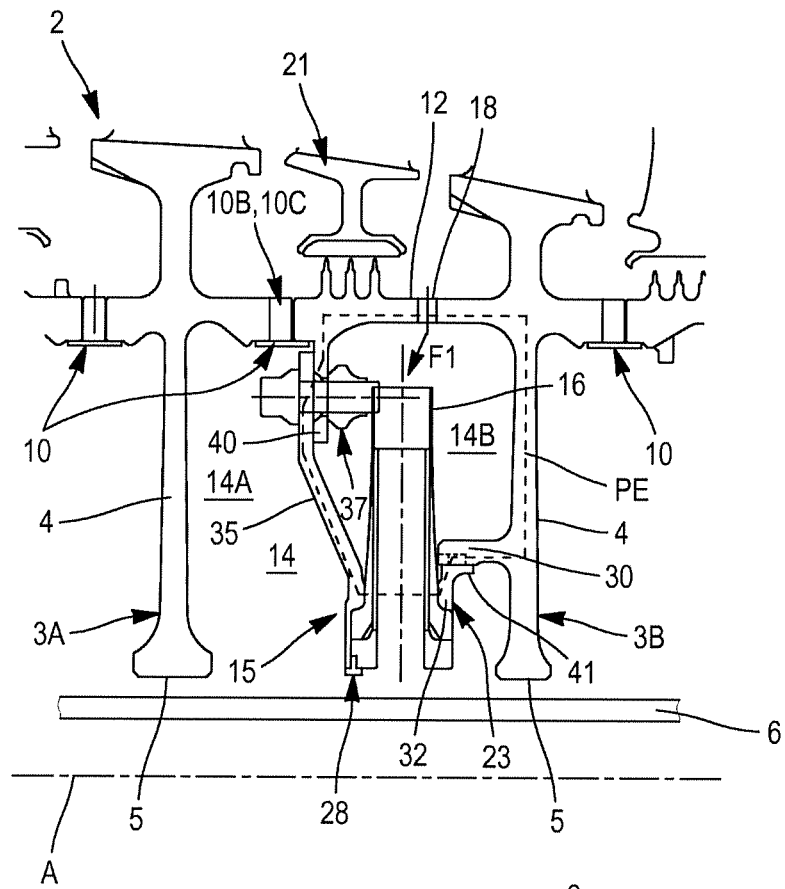
FIG. 3 is a view, similar to that of FIG. 2, showing, according to the invention, the arrangement of the centripetal air bleed device in one of the compressor discs.
Figure 4:
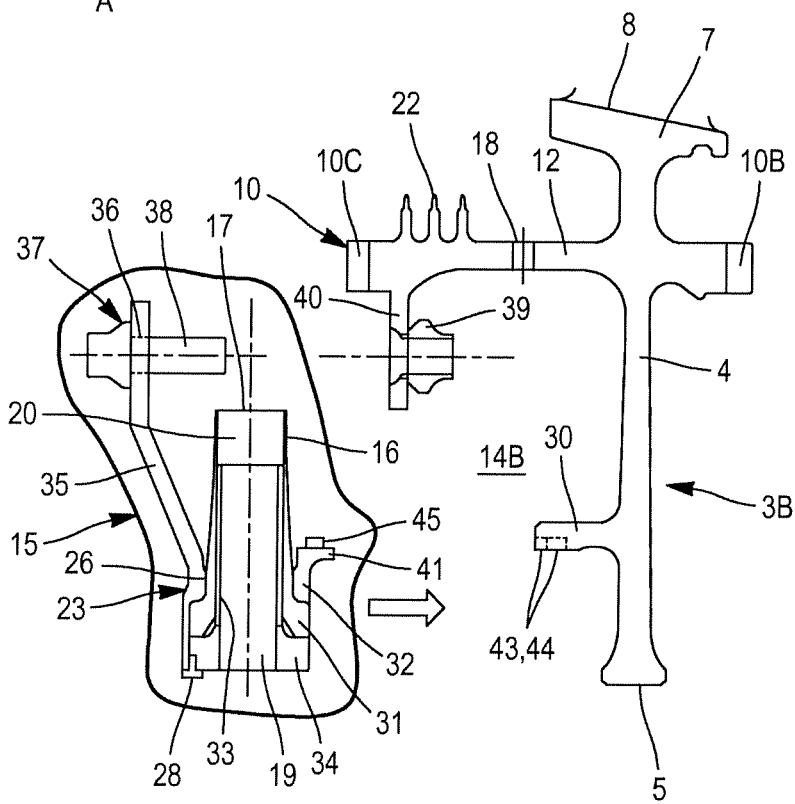
FIG. 4 shows the air bleed device from FIG. 3 before it is mounted on the downstream disc in question.

As shown in FIGS. 3 and 4, the centripetal air bleed device 15 is housed in the annular interdisc cavity 14 in question in the compressor 2 and, according to the invention, said device is connected to one of the two rotor discs, which are upstream 3A and downstream 3B, respectively, and define the cavity, namely in the internal space 14B of the downstream disc 3B in the shown embodiment.

For this purpose, the downstream disc 3B includes the air bleed device 15, which comprises a cylindrical support 23, in the openings 26 in which identical air-supply tubes 16 are radially mounted. By way of example, four air-supply tubes may be provided at 90° from one another so as to ensure that air is supplied in an appropriate manner towards the bores in the discs through which the shaft of the turbine to be cooled passes. A different number of tubes is of course possible. Each air-bleed or air-supply tube 16 is terminated at its outlet 19 by a base 31 which abuts an annular portion 32 of the cylindrical support 23.

A damping means 29, such as split damping tubes having petals 33 which, as a result of the elasticity of the petals against the wall of the respective tubes 16, are intended to absorb the centrifugal force and vibrations generated when the engine is in operation, is inserted in the inner passages 20 of these air-bleed tubes arranged radially with respect to the axis A of the engine. There is also a base 34 at the end of each damping tube 33, which base rests against the base 31 of the bleed tube 16. All the pairs of tubes 16-33 are axially held in position in the holes 26 in the support 23 by any appropriate locking means 28, such as a securing clip ring which is arranged in the support and prevents the tubes from leading into the compressor.

The cylindrical support 23 has, on the side thereof intended to face the upstream disc 3A, a substantially planar portion 35 which extends radially outwards from the annular portion 32 and has, in the region of its periphery, holes 36 in which the bolts 37 can be inserted. FIG. 4 shows that the screw 38 of the shown bolt 37 is mounted in the hole in question and the nut 39 is placed against an inner radial flange 40 of the downstream disc 3B. This flange is intended for fastening the device 15 to the disc 3B and extends perpendicularly from the cylindrical lateral wall 12 of said disc. In FIG. 3, the nut 39 of the bolt 37 is mounted on the screw 38 which locks the bleed device 15 to the upstream disc.

The cylindrical support 23 has, on the side thereof intended to face the downstream disc 3B, an outer annular rim 41, which is discussed below and is intended to engage, for centering and locking purposes, with the ring 30 which extends perpendicularly from the radial web 4 of the downstream rotor disc 3B.

Figure 5:
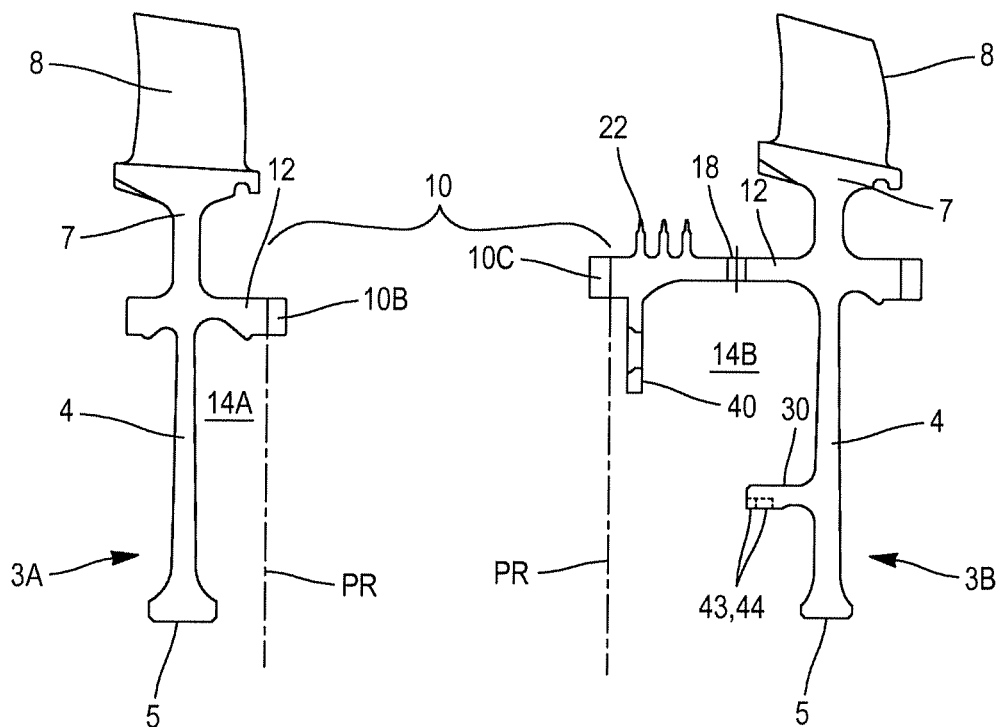
FIG. 5 shows the two rotor discs which are separated from one another by toothed connections which enable said discs to be machined diametrically.

As can be seen in particular in FIGS. 4 and 5, the bleed device 15 is housed in its entirety in the internal space 14B of the downstream disc, which space is defined by the cylindrical lateral wall 12 and the radial web 4 of said disc. For this purpose, the annular inner radial flange 40 is arranged close to the set of teeth 10C of the connection means 10 of the downstream disc and radially projects into the lateral wall, i.e. into the internal space 14B.

It can be seen in particular in FIG. 5 that the machining of the teeth of the toothed connection means 10, which teeth are diametrically opposite in pairs, does not present any problems, neither for the teeth 10C of the downstream disc 3B nor for the teeth 10B of the upstream disc 3A, since the internal spaces, which are vertically in line with the teeth 10B, 10C, are empty and unobstructed.

Indeed, relative to the radial plane PR which defines the meshing of the two sets of teeth of the connection means 10, it can be seen that the fastening flange 40 of the downstream disc, which flange is located in the space 14B, is axially offset towards the right of the plane PR and is therefore not below the set of teeth 100, and that the internal space 14A of the upstream disc now does not have a flange or any other form of obstruction inside the set of teeth 10B of the connection means, in particular vertically in line with the teeth 10B of said set. The upstream disc 3A only comprises the radial web 4 and the cylindrical lateral wall 12 at the free end of which the connection teeth 10B are formed.

Furthermore, this makes it possible to limit the interdisc cavity 14, which corresponds to the two interconnected spaces 14A, 14B, to the correct axial dimension (length) required to connect and integrate the bleed device 15 in the space 14B of the downstream disc 3B, leading to a reduced and optimised size of said disc.

The arrangement of the device 15 in this disc is shown in detail in FIG. 3. It can be seen that the radial portion 35 of the cylindrical support 25 rests against the flange 40 whilst engaging under the lateral wall 12 of the downstream disc 3B, the support being fastened to the disc by the bolts 37, and that the annular rim 41 of the annular portion 32 of said support is simultaneously inserted in the ring 30 extending from the web of the disc 3B, and this not only ensures that the "device-disc" unit is centered in a fitted manner, but also that said unit is locked by means 42, which are described below.

A simplified mounting design of this type for the air bleed device 15 which is connected in its entirety in the internal space 14B of just one of the discs also makes it possible to make the device itself and the connected discs more rigid. The centrifugal force generated by the device 15 when the engine 1 is in operation is absorbed in part by the radially annular attachment flange 40 and in part by the ring 30 which acts as a centering bearing, such that the risks of stress occurring in the disc (in particular the web) are significantly reduced. In FIG. 3, the passage of the forces PE in the disc and the device is represented by a broken line.

It is also highlighted that the flange 40 is connected to the inside of the lateral wall 12 of the disc 3B by welding, and, considering the compact size of the engine, this process is easier than machining. The weld seam is produced once the rotor disc has been machined, which means that it is not located in a region having significant forces, and so the mechanical strength of the disc is not affected thereby. The weld seam is therefore simpler to monitor.

Figures 6A, 6B, 6C:
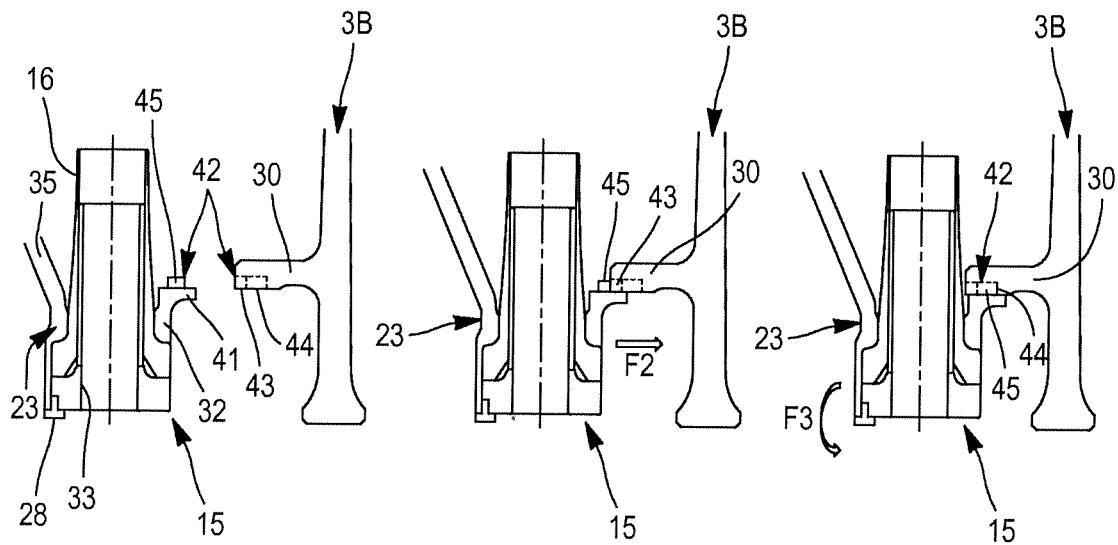
FIGS. 6a, 6b and 6c show the air bleed device being mounted, while being centered and locked, on the downstream disc of the compressor.

The locking means 42 between the support 23 and the downstream disc 3B are advantageously in the form of bayonets or dog catches, and this ensures that centering is maintained by preventing it from "breaking open". For this purpose, as is shown in FIG. 6a, at least one side slot 43, parallel to the axis A, is made in the body of the ring 30, which side slot 43 extends and ends in a blind angular slot 44 which is bent at a right angle to the axial slot 43. Therefore, at least one radial lug 45, which has a similar size to the width of the slots and is intended to be successively inserted therein, is provided on the rim 41 of the annular portion 32 of the support.

In practice, in FIG. 6b, the radial lug 45 of the cylindrical support 23 of the centripetal device is guided in the direction of the arrow F2 towards the side slot 43 of the ring, and the annular portion 32 of the support is introduced axially into the ring until the lug 45 reaches the bottom of the side slot 43. Then, in FIG. 6c, the device 15 is angularly pivoted in the direction of the arrow F3 such that the lug 45 moves into the angular slot 44 until it abuts the bottom thereof. This prevents the centripetal device 15 from detaching from the downstream disc 3B and ensures that there is always optimum centering of the portion 32 of the support 23 in the ring 30, while the risk of leaks in this region is reduced to the lowest possible level.

Since the planar portion 35 of the support faces the annular flange 40 of the downstream disc, bolts 37 lock said disc against rotation, and this ensures that the bleed device 15 does not move into the internal space 14B of the downstream disc 3B.

This results in a pre-assembled "centripetal device 15-downstream rotor disc 3B" unit which is ready to engage with the upstream rotor disc 3A by means of the toothed connections 10.

As a result of such a design of an axial compressor having a radial, centripetal cooling device which is connected to a single disc, it can also be seen that, since the centering is maintained between the two discs while the risk of leaks is at the same time limited, the amount of air bled from the duct of the compressor can be reduced. Furthermore, since the connection between the two discs is more rigid and the disc has improved dynamics, the web of the disc can be kept thin, thus ensuring a saving in weight.

The invention claimed is:

1. A rotor disc comprising, relative to an axis of rotation of the rotor disc:
   a radial web, blades on an outer periphery of the radial web, a bore in an inner periphery of the radial web, and a cylindrical lateral wall which extends the radial web in a region of the outer periphery thereof and has an air-supply opening, and a radial, centripetal air bleed device, comprising:
   a cylindrical support and at least one air-supply tube, an inlet of which faces the air-supply opening and an outlet of which faces the bore in the radial web,
   an inner radial flange extending from the cylindrical lateral wall, the cylindrical support of the radial centripetal air bleed device being fastened to said inner radial flange, and
   a centering ring extending from the radial web, the cylindrical support being centered on the centering ring,
   wherein locking means are provided between the cylindrical support of the radial centripetal air bleed device and the centering ring of the radial web, said locking means being in the form of bayonets defined by at least one axial side slot parallel to the axis of rotation of the rotor disc, which is made in the centering ring of the rotor disc and ends in a corresponding at least one angular slot bent at a right angle to said at least one axial side slot, and by at least one radial lug which projects from an annular portion of the cylindrical support, which has similar size to the width of the corresponding at least one axial side slot and the width of said at least one angular slot and which is successively inserted in said at least one axial side slot and then in said at least one angular slot, thus locking the cylindrical support in the centering ring of the radial web.

2. The rotor disc according to claim 1, wherein the cylindrical lateral wall is provided at a free end thereof with toothed connection means, said inner radial flange being located behind the toothed connection means.

3. The rotor disc according to claim 1, wherein the inner radial flange is connected to the cylindrical lateral wall of the rotor disc by welding.

4. The rotor disc according to claim 1, wherein a vibratory damping tube is provided between the at least one air-supply tube and the cylindrical support of the radial centripetal air bleed device.

5. The rotor disc according to claim 4, wherein the vibratory damping tube comprises a split damper tube having elastically deformable petals which are inserted in the at least one air-supply tube so as to rest against said at least one air-supply tube and absorb vibrations, the at least one air-supply tube and split damper tube being held in the cylindrical support of the radial centripetal air bleed device.

6. The rotor disc according to claim 1, wherein the at least one air supply tube of said radial centripetal air bleed device comprises a plurality of air-supply tubes which are arranged substantially radially in receiving holes in the cylindrical support and angularly distributed around said cylindrical support in a uniform manner.

7. A compressor of a turbine engine comprising:
   first and second coaxial rotor discs each having a respective first and second radial web and a first cylindrical lateral wall and a second cylindrical lateral wall extending respectively from said first and second radial webs in a region of outer peripheries of said first and second radial webs, blades which are arranged on an outer periphery of at least the second radial web and through which an air stream passes, a bore in an inner periphery of the second radial web, an air-supply opening in the second cylindrical lateral wall, said first and second coaxial rotor discs being rotatably interlinked by first and second toothed connection means which form respective ends of the first and second cylindrical lateral walls of the first and second coaxial rotor discs, and a radial, centripetal air bleed device which is arranged between the first and second radial webs of the first and second coaxial rotor discs and guides air from an air duct of the turbine engine towards the bore, and which comprises:

a cylindrical support and at least one air-supply tube, an inlet of which faces the air-supply opening and an outlet of which faces the bore in the second radial web, an inner radial flange extending from the second cylindrical lateral wall, the cylindrical support of the radial centripetal air bleed device being fastened to said inner radial flange, and a centering ring extending from the second radial web, the cylindrical support being centered on the centering ring, said radial centripetal air bleed device being locked to the second radial web by locking means which are provided between the cylindrical support of the radial centripetal air bleed device and the centering ring of the second radial web, said locking means being in the form of bayonets defined by at least one axial side slot parallel to the axis of rotation of the second rotor disc, which is made in the centering ring of the second rotor disc and ends in a corresponding at least one angular slot bent at a right angle to said at least one axial side slot and by at least one radial lug which projects from an annular portion of the cylindrical support, which has similar size to angular slot and which is successively inserted in said at least one axial side slot and then in said at least one angular slot, thus locking the cylindrical support in the centering ring of the second radial web, wherein said radial centripetal air bleed device is connected in its entirety in an internal space between the second radial web and the second cylindrical lateral wall of the second rotor disc, and wherein an internal space of the first coaxial rotor disc, which is defined by the first cylindrical lateral wall of the first rotor disc is free and unobstructed, at least vertically in line with the first toothed connection means thereof.

8. The compressor according to claim 7, wherein, the radial centripetal air bleed device is rigidly connected, in relation to an upstream to downstream flow direction in an air duct, to a downstream rotor disc of the first and second coaxial rotor discs, which is the second rotor disc.

9. An aircraft turbine engine comprising at least one compressor defined according to claim 7.

* * * * *